(12) United States Patent
Dong

(10) Patent No.: US 9,794,734 B2
(45) Date of Patent: Oct. 17, 2017

(54) TERMINAL SWITCHING METHOD, ACCESS DEVICE, TERMINAL, AND SYSTEM

(71) Applicant: Huawei Technologies Co., Ltd., Shenzhen (CN)

(72) Inventor: Mingjie Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/361,104

(22) Filed: Nov. 25, 2016

(65) Prior Publication Data

US 2017/0078839 A1     Mar. 16, 2017

Related U.S. Application Data

(63) Continuation of application No. PCT/CN2015/079623, filed on May 22, 2015.

(30) Foreign Application Priority Data

May 27, 2014   (CN) .......................... 2014 1 0227504

(51) Int. Cl.
*H04B 5/00* (2006.01)
*H04W 4/00* (2009.01)
(Continued)

(52) U.S. Cl.
CPC ........... *H04W 4/008* (2013.01); *H04W 4/023* (2013.01); *H04W 12/06* (2013.01); *H04W 36/08* (2013.01); *H04W 48/20* (2013.01); *H04W 76/025* (2013.01)

(58) Field of Classification Search
CPC ..... H04W 4/008; H04W 36/08; H04W 48/20; H04W 76/025; H04W 12/06
(Continued)

(56) References Cited

U.S. PATENT DOCUMENTS 8,818,276 B2    8/2014  Kiukkonen et al.
2012/0088449 A1*  4/2012  Norair .............. G06K 19/07769
                                                    455/41.1
(Continued)

FOREIGN PATENT DOCUMENTS

CN          1635713 A       7/2005
CN        102457916 A       5/2012
(Continued)

*Primary Examiner* — Ayodeji Ayotunde
(74) *Attorney, Agent, or Firm* — Leydig, Voit & Mayer, Ltd.

(57) ABSTRACT

Embodiments of the present invention relate to the wireless communications field, and provide a terminal switching method, an access device, a terminal, and a system. The method includes: establishing, by a first access device, an NFC connection to a second access device; receiving, by the first access device, an authentication parameter that is sent by the second access device by using the NFC connection; and performing access authentication on a to-be-switched terminal according to the authentication parameter, and establishing a second connection to the to-be-switched terminal after the authentication succeeds. An NFC connection is established to a second access device, an authentication parameter that is sent by the second access device by using the NFC connection is received, access authentication is performed on a to-be-switched terminal according to the authentication parameter, and a connection is established to the to-be-switched terminal after the authentication succeeds.

13 Claims, 12 Drawing Sheets

```
┌─────────────────────────────────────────────────┐
│ When a distance between a first access device    │  102
│ and a second access device falls within a range  │
│ of a near field communication NFC connection,    │
│ the first access device establishes an NFC       │
│ connection to the second access device           │
└─────────────────────────────────────────────────┘
                        ↓
┌─────────────────────────────────────────────────┐
│ The first access device receives an              │  104
│ authentication parameter of a to-be-switched     │
│ terminal that is sent by the second access       │
│ device by using the NFC connection, where the    │
│ to-be-switched terminal is some or all terminals │
│ that have established a first connection to the  │
│ second access device                             │
└─────────────────────────────────────────────────┘
                        ↓
┌─────────────────────────────────────────────────┐
│ The first access device receives an              │  106
│ authentication request sent by the to-be-        │
│ switched terminal                                │
└─────────────────────────────────────────────────┘
                        ↓
┌─────────────────────────────────────────────────┐
│ The first access device performs access          │  108
│ authentication on the to-be-switched terminal    │
│ according to the authentication parameter, and   │
│ establishes a second connection to the to-be-    │
│ switched terminal after the authentication       │
│ succeeds                                         │
└─────────────────────────────────────────────────┘
```

(51) Int. Cl.
    *H04W 36/08*     (2009.01)
    *H04W 48/20*     (2009.01)
    *H04W 4/02*     (2009.01)
    *H04W 12/06*     (2009.01)
    *H04W 76/02*     (2009.01)

(58) Field of Classification Search
    USPC ....................................................... 455/41.1
    See application file for complete search history.

(56) References Cited

U.S. PATENT DOCUMENTS

| | | |
|---|---|---|
| 2012/0100803 A1 | 4/2012 | Suumaki et al. |
| 2012/0278192 A1 | 11/2012 | Shirron et al. |
| 2013/0036231 A1* | 2/2013 | Suumaki ............... H04W 12/04 709/228 |
| 2013/0137373 A1 | 5/2013 | Choi et al. |
| 2013/0308470 A1 | 11/2013 | Bevan et al. |
| 2014/0075523 A1* | 3/2014 | Tuomaala ............. H04L 63/083 726/6 |

FOREIGN PATENT DOCUMENTS

| | | |
|---|---|---|
| CN | 102768783 A | 11/2012 |
| CN | 103139932 A | 6/2013 |
| CN | 103428808 A | 12/2013 |
| WO | WO 2013164032 A1 | 11/2013 |

* cited by examiner

TERMINAL SWITCHING METHOD, ACCESS DEVICE, TERMINAL, AND SYSTEM

CROSS-REFERENCE TO RELATED APPLICATIONS

This application is a continuation of International Application No. PCT/CN2015/079623, filed on May 22, 2015, which claims priority to Chinese Patent Application No. 201410227504.7, filed on May 27, 2014. The disclosures of the aforementioned applications are hereby incorporated by reference in their entireties.

TECHNICAL FIELD

The present invention relates to the wireless communications field, and in particular, to a terminal switching method, an access device, a terminal, and a system.

BACKGROUND

With continuous development of the field of wireless communications, currently a movable wireless access device appears. The wireless access device can automatically move to provide a better network service to a accessed terminal. The terminal may be further switched between multiple nearby movable wireless access devices. For example, the terminal accesses a wireless local area network (WLAN) by using a movable wireless access device. When the wireless access device needs to switch the accessed terminal to another access device, the wireless access device may send a switching notification to the accessed terminal, and after receiving the switching notification, the terminal searches for another nearby wireless access device that the terminal can access, and accesses the another wireless access device.

During implementation of the present invention, the inventor of the present invention finds that the prior art has at least the following problems:

A location of a movable wireless access device is not fixed, and when a terminal is switched from a wireless access device to another wireless access device, the terminal may possibly access an access device whose location is relatively remote, which therefore affects communication performance of the terminal and user experience after switching of the terminal to an access device.

SUMMARY

To resolve a problem in the prior art that when a terminal is switched from a wireless access device to another wireless access device, the terminal may possibly access an access device whose location is relatively remote, embodiments of the present invention provide a terminal switching method, an access device, a terminal, and a system. The technical solutions are as follows:

According to a first aspect, a terminal switching method is provided, where the method includes:

when a distance between a first access device and a second access device falls within a range of a near field communication NFC connection, establishing, by the first access device, an NFC connection to the second access device;

receiving, by the first access device, an authentication parameter of a to-be-switched terminal that is sent by the second access device by using the NFC connection, where the to-be-switched terminal is a terminal that has established a first connection to the second access device;

receiving, by the first access device, an authentication request sent by the to-be-switched terminal; and performing, by the first access device, access authentication on the to-be-switched terminal according to the authentication parameter, and establishing a second connection to the to-be-switched terminal after the authentication succeeds.

In a first possible implementation manner of the first aspect, the method further includes:

receiving a channel parameter that is sent by the second access device by using the NFC connection, where the channel parameter is an access channel parameter of the to-be-switched terminal; and the establishing a second connection to the to-be-switched terminal after the authentication succeeds includes:

establishing the second connection to the to-be-switched terminal according to the channel parameter.

In a second possible implementation manner of the first aspect, the method further includes:

sending a connection success response to the to-be-switched terminal, where the connection success response is used to instruct the to-be-switched terminal to cancel the first connection to the second access device.

According to a second aspect, a terminal switching method is provided, where the method includes:

when a distance between a first access device and a second access device falls within a range of a near field communication NFC connection, establishing, by the second access device, an NFC connection to the first access device;

sending, by the second access device, an authentication parameter of a to-be-switched terminal to the first access device by using the NFC connection, where the to-be-switched terminal is a terminal that has established a first connection to the second access device, and the authentication parameter is used to instruct the first access device to perform access authentication on the to-be-switched terminal according to the authentication parameter and establish a second connection to the to-be-switched terminal after the authentication succeeds.

In a first possible implementation manner of the second aspect, the method further includes:

sending a channel parameter to the first access device by using the NFC connection, where the channel parameter is an access channel parameter of the to-be-switched terminal.

In a second possible implementation manner of the second aspect, the method further includes:

after the first access device has established the second connection to the to-be-switched terminal, canceling the first connection to the to-be-switched terminal.

According to a third aspect, a terminal switching method is provided, where the method includes:

sending, by a to-be-switched terminal, an authentication request to a first access device, where the to-be-switched terminal is a terminal that has established a first connection to a second access device, and the authentication request is used to instruct the first access device to perform access authentication on the to-be-switched terminal according to an authentication parameter, where the authentication parameter is a parameter that is sent to the first access device by the second access device by using a near field communication NFC connection; and after the authentication by the first access device succeeds, establishing, by the to-be-switched terminal, a second connection to the first access device.

In a first possible implementation manner of the third aspect, the method further includes:

receiving a connection success response sent by the first access device.

According to a fourth aspect, an access device is provided, where the access device includes:

a first connection establishment module, configured to: when a distance to a second access device falls within a range of a near field communication NFC connection, establish an NFC connection to the second access device;

an authentication parameter receiving module, configured to receive an authentication parameter of a to-be-switched terminal that is sent by the second access device by using the NFC connection, where the to-be-switched terminal is a terminal that has established a first connection to the second access device;

a request receiving module, configured to receive an authentication request sent by the to-be-switched terminal;

an authentication module, configured to perform access authentication on the to-be-switched terminal according to the authentication parameter; and a second connection establishment module, configured to: after the authentication by the authentication module succeeds, establish a second connection to the to-be-switched terminal.

In a first possible implementation manner of the fourth aspect, the access device further includes:

a channel parameter receiving module, configured to: before the second connection establishment module establishes the second connection to the to-be-switched terminal, receive a channel parameter that is sent by the second access device by using the NFC connection, where the channel parameter is an access channel parameter of the to-be-switched terminal; and the second connection establishment module is configured to establish the second connection to the to-be-switched terminal according to the channel parameter.

In a second possible implementation manner of the fourth aspect, the first access device further includes:

a response sending module, configured to send a connection success response to the to-be-switched terminal, where the connection success response is used to instruct the to-be-switched terminal to cancel the first connection to the second access device.

According to a fifth aspect, an access device is provided, including:

a third connection establishment module, configured to: when a distance to a first access device falls within a range of a near field communication NFC connection, establish an NFC connection to the first access device; and an authentication parameter sending module, configured to send an authentication parameter of a to-be-switched terminal to the first access device by using the NFC connection, where the to-be-switched terminal is a terminal that has established a first connection to the third connection establishment module, and the authentication parameter is used to instruct the first access device to perform access authentication on the to-be-switched terminal according to the authentication parameter and establish a second connection to the to-be-switched terminal after the authentication succeeds.

In a first possible implementation manner of the fifth aspect, the access device further includes:

a channel parameter sending module, configured to send a channel parameter to the first access device by using the NFC connection, where the channel parameter is an access channel parameter of the to-be-switched terminal.

In a second possible implementation manner of the fifth aspect, the second access device further includes:

a first cancellation module, configured to: after the first access device has established the second connection to the to-be-switched terminal, cancel the first connection to the to-be-switched terminal.

According to a sixth aspect, a terminal is provided, where the terminal includes:

a request sending module, configured to send an authentication request to a first access device, where the authentication request is used to instruct the first access device to perform access authentication on the to-be-switched terminal according to an authentication parameter, where the authentication parameter is a parameter that is sent to the first access device by the second access device by using a near field communication NFC connection; and a fourth connection establishment module, configured to: after the authentication by the first access device succeeds, establish a second connection to the first access device.

In a first possible implementation manner of the sixth aspect, the terminal further includes:

a response receiving module, configured to receive a connection success response sent by the first access device.

According to a seventh aspect, a terminal switching system is provided, where the system includes:

the first access device, the second access device, and at least one terminal according to the foregoing descriptions.

The technical solutions provided in the embodiments of the present invention have the following beneficial effects:

A first access device establishes a near field communication NFC connection to a second access device, receives an authentication parameter of a to-be-switched terminal that is sent by the second access device by using the NFC connection, performs access authentication on the to-be-switched terminal according to the authentication parameter, and establishes a connection to the to-be-switched terminal after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

NFC (Near Field Communication) is a short-distance high-frequency radio technology, and is developed based on an RFID (Radio Frequency Identification) and an interconnection technology. Two devices having an NFC function can communicate within a short distance (which generally does not exceed 20 cm).

Figure 1:
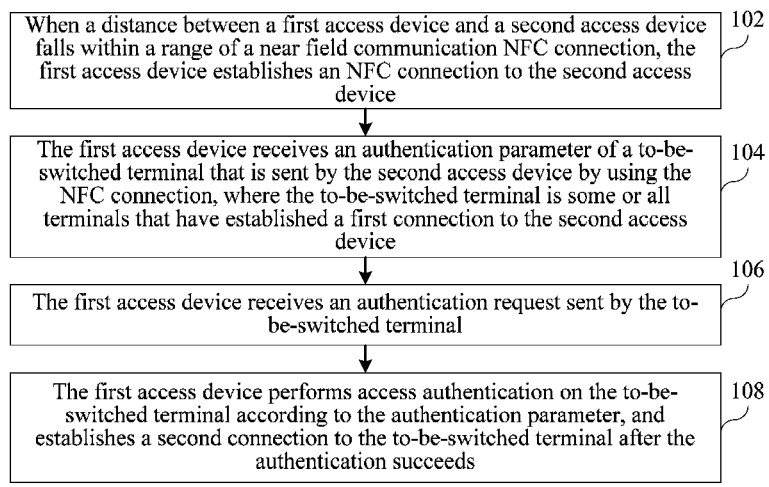
FIG. 1 is a method flowchart of a terminal switching method according to an embodiment of the present invention.

Refer to FIG. 1, which is a method flowchart of a terminal switching method according to an embodiment of the present invention. In this embodiment, when a terminal that accesses a second access device needs to be switched from the second access device to another access device, a first access device establishes a connection to the terminal to be switched. The terminal switching method may include:

Step 102. When a distance between the first access device and the second access device falls within a range of a near field communication NFC connection, the first access device establishes an NFC connection to the second access device.

Step 104. The first access device receives an authentication parameter of a to-be-switched terminal that is sent by the second access device by using the NFC connection, where the to-be-switched terminal is some or all terminals that have established a first connection to the second access device.

Step 106. The first access device receives an authentication request sent by the to-be-switched terminal.

Step 108. The first access device performs access authentication on the to-be-switched terminal according to the authentication parameter, and establishes a second connection to the to-be-switched terminal after the authentication succeeds.

To sum up, according to the terminal switching method provided in this embodiment of the present invention, a first access device establishes a near field communication NFC connection to a second access device, receives an authentication parameter of a to-be-switched terminal that is sent by the second access device by using the NFC connection, performs access authentication on the to-be-switched terminal according to the authentication parameter, and establishes a connection to the to-be-switched terminal after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the terminal switching method provided in this embodiment of the present invention, before switching is performed, the second access device has sent the authentication parameter of the to-be-switched terminal to the first access device. Therefore, negotiations between the terminal and the first access device during switching are reduced, and a switching process is smoother.

Figure 2:
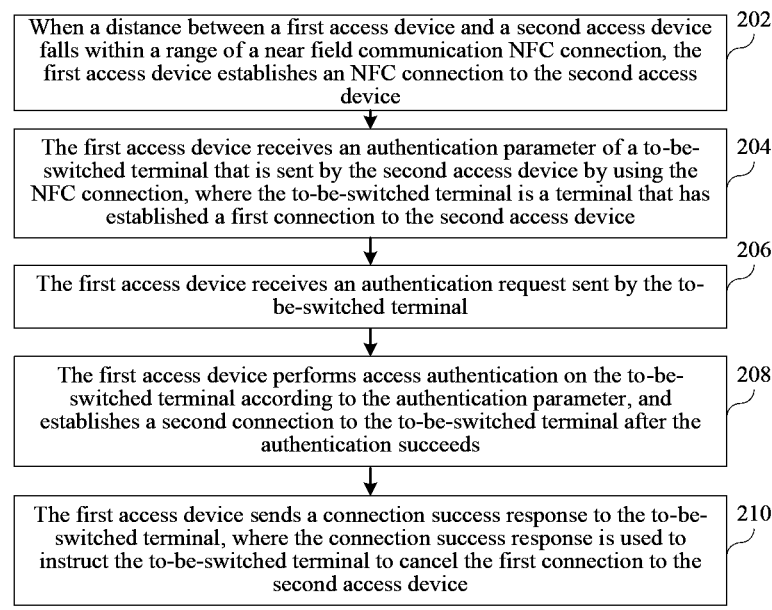
FIG. 2 is a method flowchart of a terminal switching method according to another embodiment of the present invention.

Refer to FIG. 2, which is a method flowchart of a terminal switching method according to another embodiment of the present invention. In this embodiment, when a terminal that accesses a second access device needs to be switched from the second access device to another access device, a first access device establishes a connection to the terminal to be switched. The first access device and the second access device are movable wireless access devices such as Wi-Fi robots or wireless access points APs. The terminal switching method may include:

Step 202. When a distance between the first access device and the second access device falls within a range of a near field communication NFC connection, the first access device establishes an NFC connection to the second access device.

In an example, the first access device and the second access device are Wi-Fi robots or wireless access points APs. The first access device and the second access device may freely adjust locations according to information such as a quantity or distribution of accessed terminals, so as to provide a better network access service to the terminals. Movements of the access devices may be controlled by an individual controller, and the controller may be disposed on a side of a base station that is connected to the access devices. Currently, one or more terminals have established a Wi-Fi connection to the second access device, and the second access device provides a network access service to the terminals by using the established Wi-Fi connection. When communication quality decreases because the second access device has insufficient power or there is an excessively large quantity of accessed terminals, the second access device may send a request to the controller to switch the terminal that accesses the second access device to another access device. After receiving the request, the controller determines that the first access device is a target access device to which the terminal is to be switched, and instructs the first access device to move to a location of the second access device along a specified path. In addition, the first access device and the second access device start an NFC pairing test, and when a distance between the two falls within a range of an NFC connection, one of the two can detect an NFC pairing signal sent by the other. In this case, the first access device may determine that the first access device has arrived near the second access device, and the accessed terminal may be switched. Specifically, for example, after sending a request to the controller to switch the terminal to another access device, the second access device receives an identifier of the first access device that is returned by the controller, regularly receives an NFC pairing signal, and compares a device identifier included in the received pairing signal with the identifier of the first access device. If the two identifiers are consistent, the second access device determines that a device that sends the NFC pairing signal is the first access device, and interacts with the first access device to establish an NFC connection.

Step 204. The first access device receives an authentication parameter of a to-be-switched terminal that is sent by the second access device by using the NFC connection, where the to-be-switched terminal is a terminal that has established a first connection to the second access device.

The first connection may be a Wi-Fi connection established between the to-be-switched terminal and the second access device. When the second access device has insufficient power, the to-be-switched terminal may be all terminals that have established a Wi-Fi connection to the second access device. When there is an excessively large quantity of terminals that are accessed the second access device and offloading needs to be performed, the to-be-switched terminal may be some specified terminals of all terminals that have established a Wi-Fi connection to the second access device. The authentication parameter may be used to perform identity authentication on the to-be-switched terminal. For example, the authentication parameter may be a PMK (Pairwise Master Key), a PTK (Pairwise Transient Key), or a GTK (Group Temporal Key). Specific content of the authentication parameter is not specifically limited in this embodiment.

Step 206. The first access device receives an authentication request sent by the to-be-switched terminal.

The authentication request of the to-be-switched terminal may be triggered by the first access device, or may be triggered by the second access device. Specifically, when the first access device has established the NFC connection to the second access device, after the second access device receives the authentication parameter that is sent by the first access device by using the NFC connection, the second access device may send a switching notification that includes an identifier of the first access device to the to-be-switched terminal, and after receiving the switching notification, the to-be-switched terminal sends an authentication request to the first access device; or the authentication parameter may carry an identifier of the to-be-switched terminal, when the first access device has established the NFC connection to the second access device, after the second access device receives the authentication parameter that is sent by the first access device by using the NFC connection, the first access device may send a switching notification to the to-be-switched terminal according to the identifier of the to-be-switched terminal, and after receiving the switching notification, the to-be-switched terminal sends an authentication request to the first access device.

Step 208. The first access device performs access authentication on the to-be-switched terminal according to the authentication parameter, and establishes a second connection to the to-be-switched terminal after the authentication succeeds.

The second connection may be a Wi-Fi connection established between the to-be-switched terminal and the first access device. When the first access device receives an authentication request sent by a terminal and performs authentication according to the authentication parameter sent by the second access device, after the authentication succeeds, it may be determined that the terminal is the to-be-switched terminal that needs to be switched from the second access device to the first access device. In this case, the first access device may establish a Wi-Fi connection to the terminal, and replace the second access device to provide a network access service to the terminal.

In addition, the first access device may further receive a channel parameter that is sent by the second access device by using the NFC connection, where the channel parameter is an access channel parameter used by the to-be-switched terminal to access the second access device. The first access device may establish a second connection to the to-be-switched terminal according to the channel parameter.

To simplify a process of interaction with a device when a terminal is switched, and rapidly establish a Wi-Fi connection between the first access device and the to-be-switched terminal, to enable the to-be-switched terminal to be seamlessly switched to the first access device, the second access device may further send, by using the NFC connection, the access channel parameter used by the to-be-switched terminal to access the second access device to the first access device, where the channel parameter may be a working channel, channel bandwidth, and the like of the to-be-switched terminal. The first access device may send a switching notification to the to-be-switched terminal according to the channel parameter, to instruct the to-be-switched terminal to send an authentication request, or may directly establish a Wi-Fi connection to the to-be-switched terminal according to the channel parameter, so that the to-be-switched terminal can continue to use an original working channel to perform network access.

Step 210. The first access device sends a connection success response to the to-be-switched terminal, where the connection success response is used to instruct the to-be-switched terminal to cancel the first connection to the second access device.

After the first access device has established a Wi-Fi connection to the to-be-switched terminal, the first access device may send a connection success response to the to-be-switched terminal, and the to-be-switched terminal may perform network access by using the Wi-Fi connection to the first access device. After receiving the connection success response, the to-be-switched terminal still interacts with the second access device, to cancel the Wi-Fi connection between the to-be-switched terminal and the second access device, so as to complete the process of switching from the second access device to the first access device.

It should be noted that, when a connection is successfully established between the to-be-switched terminal and the first access device, and a connection to the second access device is not yet canceled, the to-be-switched terminal are simultaneously accessed two access devices by using a same working channel, that is, the to-be-switched terminal may receive data sent by both the first access device and the second access device, and both the first access device and the second access device may receive data sent by the to-be-switched terminal. To prevent network data from being repeatedly sent to the to-be-switched terminal, or to prevent data sent by the to-be-switched terminal from being repeatedly sent to a network, the first access device and the second access device may transmit an identifier of data to each other by using the NFC connection. When one access device is to forward a particular piece of data, the access device sends an identifier of the data to the other access device, and after receiving the identifier of the data, the other access device ignores the data, and does not forward the data.

To sum up, according to the terminal switching method provided in this embodiment of the present invention, a near field communication NFC connection is established to a second access device, an authentication parameter of a to-be-switched terminal that is sent by the second access device by using the NFC connection is received, access authentication is performed on the to-be-switched terminal according to the authentication parameter, and a connection is established to the to-be-switched terminal after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the terminal switching method provided in this embodiment of the present invention, before switching is performed, the second access device has sent the authentication parameter of the to-be-switched terminal to the first access device. Therefore, negotiations between the terminal and the first access device during switching are reduced, and a switching process is smoother.

In addition, according to the terminal switching method provided in this embodiment of the present invention, a channel parameter that is sent by the second access device by using the NFC connection is received, and a second connection is established according to the channel parameter, which can simplify a process of interaction with a device when a terminal is switched, and rapidly establish a Wi-Fi connection between the first access device and the to-be-switched terminal, thereby enabling the to-be-switched terminal to be seamlessly switched to the first access device, and improving user experience.

Figure 3:
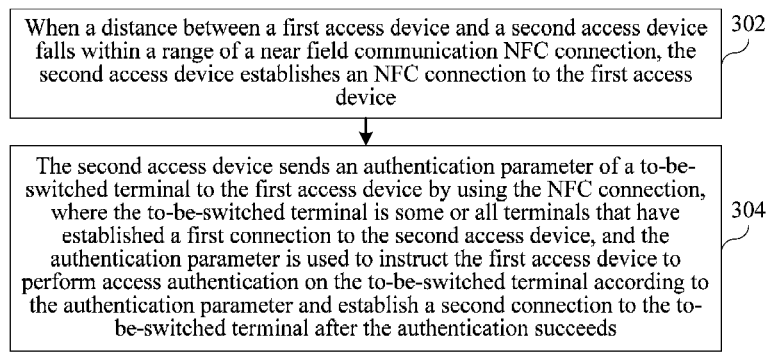
FIG. 3 is a method flowchart of a terminal switching method according to an embodiment of the present invention.

Refer to FIG. 3, which is a method flowchart of a terminal switching method according to an embodiment of the present invention. In this embodiment, at a second access device, a terminal that accesses the second access device is switched to a first access device. The terminal switching method may include:

Step 302. When a distance between the first access device and the second access device falls within a range of a near field communication NFC connection, the second access device establishes an NFC connection to the first access device.

Step 304. The second access device sends an authentication parameter of a to-be-switched terminal to the first access device by using the NFC connection, where the to-be-switched terminal is some or all terminals that have established a first connection to the second access device, and the authentication parameter is used to instruct the first access device to perform access authentication on the to-be-switched terminal according to the authentication parameter and establish a second connection to the to-be-switched terminal after the authentication succeeds.

To sum up, according to the terminal switching method provided in this embodiment of the present invention, an NFC connection is established to a first access device, an authentication parameter of a to-be-switched terminal is sent to the first access device by using the NFC connection, and the first access device performs access authentication on the to-be-switched terminal according to the authentication parameter, and establishes a second connection to the to-be-switched terminal after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the terminal switching method provided in this embodiment of the present invention, the second access device sends the authentication parameter of the to-be-switched terminal to the first access device in advance. Therefore, negotiations between the to-be-switched terminal and the first access device when the to-be-switched terminal is switched are reduced, and a switching process is smoother.

Figure 4:
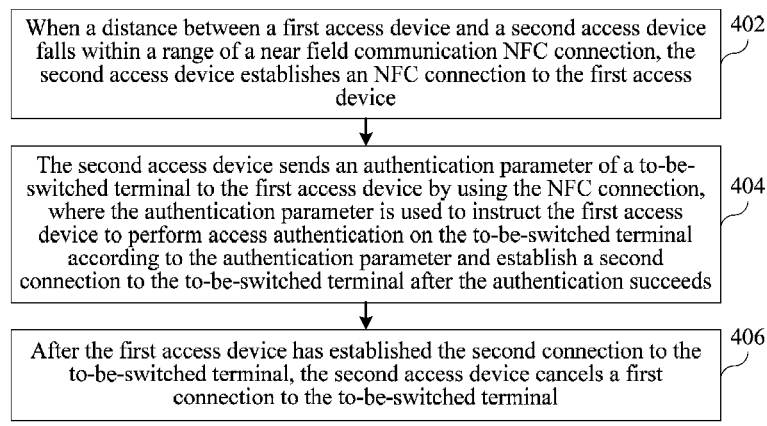
FIG. 4 is a method flowchart of a terminal switching method according to another embodiment of the present invention.

Refer to FIG. 4, which is a method flowchart of a terminal switching method according to another embodiment of the present invention. In this embodiment, at a second access device, a terminal that accesses the second access device is switched to a first access device. The first access device and the second access device are movable wireless access devices such as Wi-Fi robots. The terminal switching method may include:

Step 402. When a distance between the first access device and the second access device falls within a range of a near field communication NFC connection, the second access device establishes an NFC connection to the first access device.

In an example, the first access device and the second access device are Wi-Fi robots or wireless access points APs. The first access device and the second access device may freely adjust locations according to information such as a quantity or distribution of accessed terminals, so as to provide a better network access service to the terminals.

Movements of the access devices may be controlled by an individual controller, and the controller may be disposed on a side of a base station that is connected to the access devices. Currently, several terminals have established a Wi-Fi connection to the second access device, and the second access device provides a network access service to the terminals by using the established Wi-Fi connection. When communication quality decreases because the second access device has insufficient power or there is an excessively large quantity of accessed terminals, the second access device may send a request to the controller to switch the terminal that accesses the second access device to another access device. After receiving the request, the controller determines that the first access device is a target access device to which the terminal is to be switched, and instructs the first access device to move to a location of the second access device along a specified path. In addition, the first access device and the second access device start an NFC pairing test, and when a distance between the two falls within a range of an NFC connection, one of the two can detect an NFC pairing signal sent by the other. In this case, the first access device may determine that the first access device has arrived near the second access device, and the accessed terminal may be switched. For example, after sending a request to the controller to switch the terminal to another access device, the second access device receives an identifier of the first access device that is returned by the controller, regularly receives an NFC pairing signal, and compares a device identifier included in the received pairing signal with the identifier of the first access device. If the two identifiers are consistent, the second access device determines that a device that sends the NFC pairing signal is the first access device, and interacts with the first access device to establish an NFC connection.

Step 404. The second access device sends an authentication parameter of a to-be-switched terminal to the first access device by using the NFC connection, where the authentication parameter is used to instruct the first access device to perform access authentication on the to-be-switched terminal according to the authentication parameter and establish a second connection to the to-be-switched terminal after the authentication succeeds.

The to-be-switched terminal is a terminal that has established a first connection to the second access device.

The first connection may be a Wi-Fi connection established between the to-be-switched terminal and the second access device, and the second connection may be a Wi-Fi connection established between the to-be-switched terminal and the first access device.

When the second access device has insufficient power, the to-be-switched terminal may be all terminals that have established a Wi-Fi connection to the second access device. When there is an excessively large quantity of terminals that are accessed the second access device and offloading needs to be performed, the to-be-switched terminal may be some specified terminals of all terminals that have established a Wi-Fi connection to the second access device. The authentication parameter may be used to perform identity authentication on the to-be-switched terminal. For example, the authentication parameter may be a PMK, a PTK, or a GTK. Specific content of the authentication parameter is not specifically limited in this embodiment.

The second access device may trigger the to-be-switched terminal to send an authentication request to the first access device. For example, when the first access device has established the NFC connection to the second access device, after the second access device receives the authentication parameter that is sent by the first access device by using the NFC connection, the second access device may send a switching notification that includes an identifier of the first access device to the to-be-switched terminal, and after receiving the switching notification, the to-be-switched terminal sends an authentication request to the first access device; or the authentication request of the to-be-switched terminal may also be triggered by the first access device. For example, the authentication parameter may carry an identifier of the to-be-switched terminal, when the first access device has established the NFC connection to the second access device, after the second access device receives the authentication parameter that is sent by the first access device by using the NFC connection, the first access device sends a switching notification to the to-be-switched terminal according to the identifier of the to-be-switched terminal, and after receiving the switching notification, the to-be-switched terminal sends an authentication request to the first access device.

When the first access device receives an authentication request sent by a terminal and performs authentication according to the authentication parameter sent by the second access device, after the authentication succeeds, it may be determined that the terminal is the to-be-switched terminal that needs to be switched from the second access device to the first access device. In this case, the first access device may establish a Wi-Fi connection to the terminal, and replace the second access device to provide a network access service to the terminal.

In addition, the second access device may further send a channel parameter to the first access device by using the NFC connection, where the channel parameter is an access channel parameter used by the to-be-switched terminal to access the second access device. The first access device may establish a second connection to the to-be-switched terminal according to the channel parameter.

To simplify a process of interaction with a device when a terminal is switched, and rapidly establish a Wi-Fi connection between the first access device and the to-be-switched terminal, to enable the to-be-switched terminal to be seamlessly switched to the first access device, the second access device may further send, by using the NFC connection, the access channel parameter used by the to-be-switched terminal to access the second access device to the first access device, where the channel parameter may be a working channel, channel bandwidth, and the like of the to-be-switched terminal. The first access device may send a switching notification to the to-be-switched terminal according to the channel parameter, to instruct the to-be-switched terminal to send an authentication request, or may directly establish a Wi-Fi connection to the to-be-switched terminal according to the channel parameter, so that the to-be-switched terminal can continue to use an original working channel to perform network access.

Step 406. After the first access device has established the second connection to the to-be-switched terminal, the second access device cancels a first connection to the to-be-switched terminal.

After the first access device has established a Wi-Fi connection to the to-be-switched terminal, the first access device may send a connection success response to the to-be-switched terminal, and the to-be-switched terminal may perform network access by using the Wi-Fi connection to the first access device. After receiving the connection success response, the to-be-switched terminal still interacts with the second access device, to cancel the Wi-Fi connection between the to-be-switched terminal and the second access device, so as to complete the process of switching from the second access device to the first access device.

It should be noted that, when a connection is successfully established between the to-be-switched terminal and the first access device, and a connection to the second access device is not yet canceled, the to-be-switched terminal are simultaneously accessed two access devices by using a same working channel, that is, the to-be-switched terminal may receive data sent by both the first access device and the second access device, and both the first access device and the second access device may receive data sent by the to-be-switched terminal. To prevent network data from being repeatedly sent to the to-be-switched terminal, or to prevent data sent by the to-be-switched terminal from being repeatedly sent to a network, the first access device and the second access device may transmit an identifier of data to each other by using the NFC connection. When one access device is to forward a particular piece of data, the access device sends an identifier of the data to the other access device, and after receiving the identifier of the data, the other access device may ignore the data, and does not forward the data.

To sum up, according to the terminal switching method provided in this embodiment of the present invention, an NFC connection is established to a first access device, an authentication parameter of a to-be-switched terminal is sent to the first access device by using the NFC connection, and the first access device performs access authentication on the to-be-switched terminal according to the authentication parameter, and establishes a second connection to the to-be-switched terminal after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the terminal switching method provided in this embodiment of the present invention, the second access device sends the authentication parameter of the to-be-switched terminal to the first access device in advance. Therefore, negotiations between the to-be-switched terminal and the first access device when the to-be-switched terminal is switched are reduced, and a switching process is smoother.

In addition, according to the terminal switching method provided in this embodiment of the present invention, a channel parameter is sent to the first access device by using the NFC connection, and the first access device establishes a second connection according to the channel parameter, which can simplify a process of interaction with a device when a terminal is switched, and rapidly establish a Wi-Fi connection between the first access device and the to-be-switched terminal, thereby enabling the to-be-switched terminal to be seamlessly switched to the first access device, and improving user experience.

Figure 5:
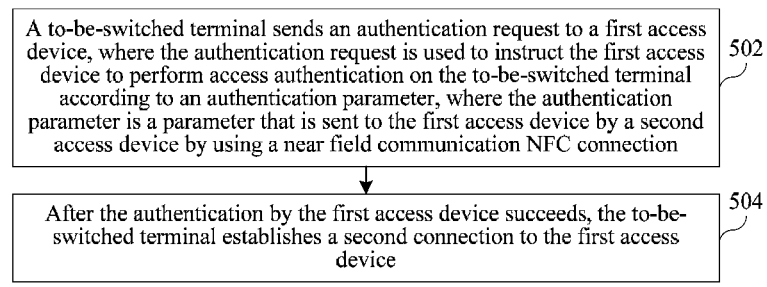
FIG. 5 is a method flowchart of a terminal switching method according to an embodiment of the present invention.

Refer to FIG. 5, which is a method flowchart of a terminal switching method according to an embodiment of the present invention. In this embodiment, a to-be-switched terminal has established a first connection to a second access device, and the to-be-switched terminal is switched from the second access device to a first access device. The terminal switching method may include:

Step 502. The to-be-switched terminal sends an authentication request to the first access device, where the authentication request is used to instruct the first access device to perform access authentication on the to-be-switched terminal according to an authentication parameter, where the authentication parameter is a parameter that is sent to the first access device by the second access device by using a near field communication NFC connection.

Step 504. After the authentication by the first access device succeeds, the to-be-switched terminal establishes a second connection to the first access device.

To sum up, according to the terminal switching method provided in this embodiment of the present invention, after a first access device receives an authentication parameter that is sent by a second access device by using an NFC connection, an authentication request is sent to the first access device, the first access device performs access authentication according to the authentication parameter, and a second connection is established to the first access device after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Figure 6:
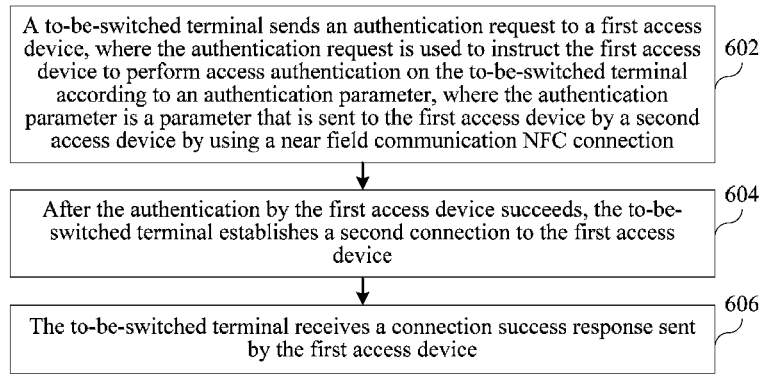
FIG. 6 is a method flowchart of a terminal switching method according to another embodiment of the present invention.

Refer to FIG. 6, which is a method flowchart of a terminal switching method according to another embodiment of the present invention. In this embodiment, a to-be-switched terminal has established a first connection to a second access device, and the to-be-switched terminal is switched from the second access device to a first access device. The first access device and the second access device are movable wireless access devices such as Wi-Fi robots. The terminal switching method may include:

Step 602. The to-be-switched terminal sends an authentication request to the first access device, where the authentication request is used to instruct the first access device to perform access authentication on the to-be-switched terminal according to an authentication parameter, where the authentication parameter is a parameter that is sent to the first access device by the second access device by using a near field communication NFC connection.

The first connection may be a Wi-Fi connection established between the to-be-switched terminal and the second access device.

In an example, the first access device and the second access device are Wi-Fi robots or wireless access points APs. The first access device and the second access device may freely adjust locations according to information such as a quantity or distribution of accessed terminals, so as to provide a better network access service to the terminals. Movements of the access devices may be controlled by an individual controller, and the controller may be disposed on a side of a base station that is connected to the access devices. Currently, several terminals have established a Wi-Fi connection to the second access device, and the second access device provides a network access service to the terminals by using the established Wi-Fi connection. When communication quality decreases because the second access device has insufficient power or there is an excessively large quantity of accessed terminals, the second access device may send a request to the controller to switch the terminal that accesses the second access device to another access device. After receiving the request, the controller determines that the first access device is a target access device to which the terminal is to be switched, and instructs the first access device to move to a location of the second access device along a specified path. In addition, the first access device and the second access device start an NFC pairing test, and when a distance between the two falls within a range of an NFC connection, one of the two can detect an NFC pairing signal sent by the other. In this case, the first access device may determine that the first access device has arrived near the second access device, and the accessed terminal may be switched. For example, after sending a request to the controller to switch the terminal to another access device, the second access device receives an identifier of the first access device that is returned by the controller, regularly receives an NFC pairing signal, and compares a device identifier included in the received pairing signal with the identifier of the first access device. If the two identifiers are consistent, the second access device determines that a device that sends the NFC pairing signal is the first access device, and interacts with the first access device to establish an NFC connection.

When the second access device has insufficient power, the to-be-switched terminal may be all terminals that have established a Wi-Fi connection to the second access device. When there is an excessively large quantity of terminals that are accessed the second access device and offloading needs to be performed, the to-be-switched terminal may be some specified terminals of all terminals that have established a Wi-Fi connection to the second access device. The authentication parameter may be used to perform identity authentication on the to-be-switched terminal. For example, the authentication parameter may be a PMK, a PTK, or a GTK. Specific content of the authentication parameter is not specifically limited in this embodiment.

In addition, the authentication request of the to-be-switched terminal may be triggered by the first access device, or may be triggered by the second access device. Specifically, when the first access device has established the NFC connection to the second access device, after the second access device receives the authentication parameter that is sent by the first access device by using the NFC connection, the second access device may send a switching notification that includes the identifier of the first access device to the to-be-switched terminal, and after receiving the switching notification, the to-be-switched terminal sends an authentication request to the first access device; or the authentication parameter may carry an identifier of the to-be-switched terminal, when the first access device has established the NFC connection to the second access device, after the second access device receives the authentication parameter that is sent by the first access device by using the NFC connection, the first access device may send a switching notification to the to-be-switched terminal according to the identifier of the to-be-switched terminal, and after receiving the switching notification, the to-be-switched terminal sends an authentication request to the first access device.

Step 604. After the authentication by the first access device succeeds, the to-be-switched terminal establishes a second connection to the first access device.

The second connection may be a Wi-Fi connection established between the to-be-switched terminal and the first access device. When the first access device receives an authentication request sent by a terminal and performs authentication according to the authentication parameter sent by the second access device, after the authentication succeeds, it may be determined that the terminal is the to-be-switched terminal that needs to be switched from the second access device to the first access device. In this case, the first access device may establish a Wi-Fi connection to the terminal, and replace the second access device to provide a network access service to the terminal.

Step 606. The to-be-switched terminal receives a connection success response sent by the first access device.

After the first access device has established a Wi-Fi connection to the to-be-switched terminal, the first access device may send a connection success response to the to-be-switched terminal, and after receiving the connection success response, the to-be-switched terminal may perform network access by using the Wi-Fi connection to the first access device. After receiving the connection success response, the to-be-switched terminal still interacts with the second access device, to cancel the Wi-Fi connection between the to-be-switched terminal and the second access device, so as to complete the process of switching from the second access device to the first access device.

It should be noted that, when a connection is successfully established between the to-be-switched terminal and the first access device, and a connection to the second access device is not yet canceled, the to-be-switched terminal are simultaneously accessed two access devices by using a same working channel, that is, the to-be-switched terminal may receive data sent by both the first access device and the second access device, and both the first access device and the second access device may receive data sent by the to-be-switched terminal. To prevent network data from being repeatedly sent to the to-be-switched terminal, or to prevent data sent by the to-be-switched terminal from being repeatedly sent to a network, the first access device and the second access device may transmit an identifier of data to each other by using the NFC connection. When one access device is to forward a particular piece of data, the access device sends an identifier of the data to the other access device, and after receiving the identifier of the data, the other access device may ignore the data, and does not forward the data.

To sum up, according to the terminal switching method provided in this embodiment of the present invention, after a first access device receives an authentication parameter that is sent by a second access device by using an NFC connection, an authentication request is sent to the first access device, the first access device performs access authentication according to the authentication parameter, and a second connection is established to the first access device after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Figure 7:
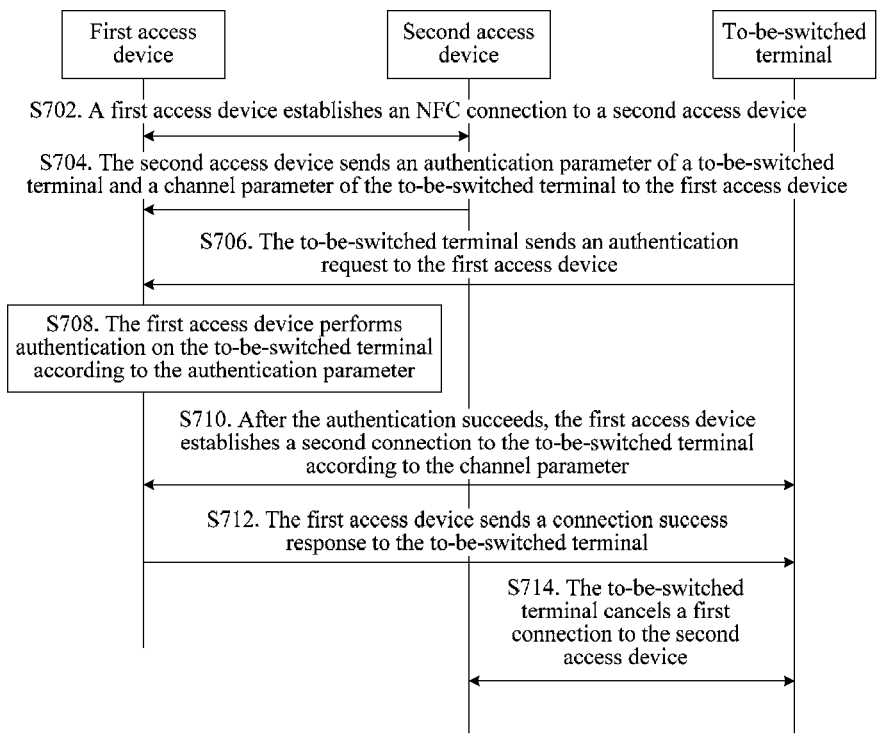
FIG. 7 is a method flowchart of a terminal switching method according to an embodiment of the present invention.

Refer to FIG. 7, which is a method flowchart of a terminal switching method according to an embodiment of the present invention. In this embodiment, in a system that includes a first access device and a second access device, a to-be-switched terminal that accesses the second access device is switched to the first access device. The first access device and the second access device are movable wireless access devices such as Wi-Fi robots. The terminal switching method may include:

Step 702. The first access device establishes an NFC connection to the second access device.

In an example, the first access device and the second access device are Wi-Fi robots or wireless access points APs. The first access device and the second access device may freely adjust locations according to information such as a quantity or distribution of accessed terminals, so as to provide a better network access service to the terminals. Movements of the access devices may be controlled by an individual controller, and the controller may be disposed on a side of a base station that is connected to the access devices. Currently, several terminals have established a Wi-Fi connection to the second access device, and the second access device provides a network access service to the terminals by using the established Wi-Fi connection. When communication quality decreases because the second access device has insufficient power or there is an excessively large quantity of accessed terminals, the second access device may send a request to the controller to switch the terminal that accesses the second access device to another access device. After receiving the request, the controller determines that the first access device is a target access device to which the terminal is to be switched, and instructs the first access device to move to a location of the second access device along a specified path. In addition, the first access device and the second access device start an NFC pairing test, and when a distance between the two falls within a range of an NFC connection, one of the two can detect an NFC pairing signal sent by the other. In this case, the first access device may determine that the first access device has arrived near the second access device, and the accessed terminal may be switched. For example, after sending a request to the controller to switch the terminal to another access device, the second access device receives an identifier of the first access device that is returned by the controller, regularly receives an NFC pairing signal, and compares a device identifier included in the received pairing signal with the identifier of the first access device. If the two identifiers are consistent, the second access device determines that a device that sends the NFC pairing signal is the first access device, and interacts with the first access device to establish an NFC connection.

Step 704. The second access device sends an authentication parameter of a to-be-switched terminal and a channel parameter of the to-be-switched terminal to the first access device.

The to-be-switched terminal is a terminal that has established a first connection to the second access device.

The first connection may be a Wi-Fi connection established between the to-be-switched terminal and the second access device. When the second access device has insufficient power, the to-be-switched terminal may be all terminals that have established a Wi-Fi connection to the second access device. When there is an excessively large quantity of terminals that are accessed the second access device and offloading needs to be performed, the to-be-switched terminal may be some specified terminals of all terminals that have established a Wi-Fi connection to the second access device. The authentication parameter may be used to perform identity authentication on the to-be-switched terminal. For example, the authentication parameter may be a PMK, a PTK, or a GTK. Specific content of the authentication parameter is not specifically limited in this embodiment.

To simplify a process of interaction with a device when a terminal is switched, and rapidly establish a Wi-Fi connection between the first access device and the to-be-switched terminal, to enable the to-be-switched terminal to be seamlessly switched to the first access device, the second access device may further send, by using the NFC connection, the access channel parameter used by the to-be-switched terminal to access the second access device to the first access device, where the channel parameter may be a working channel, channel bandwidth, and the like of the to-be-switched terminal.

Step 706. The to-be-switched terminal sends an authentication request to the first access device.

The authentication request of the to-be-switched terminal may be triggered by the first access device, or may be triggered by the second access device. Specifically, when the first access device has established the NFC connection to the second access device, after the second access device receives the authentication parameter that is sent by the first access device by using the NFC connection, the second access device may send a switching notification that includes an identifier of the first access device to the to-be-switched terminal, and after receiving the switching notification, the to-be-switched terminal sends an authentication request to the first access device; or the authentication parameter may carry an identifier of the to-be-switched terminal, when the first access device has established the NFC connection to the second access device, after the second access device receives the authentication parameter that is sent by the first access device by using the NFC connection, the first access device may send a switching notification to the to-be-switched terminal according to the identifier of the to-be-switched terminal, or the first access device may also send a switching notification to the to-be-switched terminal according to the channel parameter of the to-be-switched terminal, and after receiving the switching notification, the to-be-switched terminal sends an authentication request to the first access device.

Step 708. The first access device performs authentication on the to-be-switched terminal according to the authentication parameter.

Specifically, the first access device may listen to an authentication request according to the channel parameter of the to-be-switched terminal. When an authentication request sent by a terminal is received, authentication is performed on the terminal according to the authentication parameter sent by the second access device, and if the authentication succeeds, it is determined that the terminal is the to-be-switched terminal.

Step 710. After the authentication succeeds, the first access device establishes a second connection to the to-be-switched terminal according to the channel parameter.

The second connection may be a Wi-Fi connection established between the to-be-switched terminal and the first access device. The first access device performs authentication on the to-be-switched terminal, and after the authentication succeeds, may establish a Wi-Fi connection to the to-be-switched terminal, and replace the second access device to provide a network access service to the terminal. Specifically, the first access device may directly establish a Wi-Fi connection to the to-be-switched terminal according to the channel parameter, so that the to-be-switched terminal can continue to use an original working channel to perform network access.

Step 712. The first access device sends a connection success response to the to-be-switched terminal.

After the first access device has established a Wi-Fi connection to the to-be-switched terminal, the first access device may send a connection success response to the to-be-switched terminal, and the to-be-switched terminal may perform network access by using the Wi-Fi connection to the first access device.

Step 714. The to-be-switched terminal cancels a first connection to the second access device.

After receiving the connection success response, the to-be-switched terminal still interacts with the second access device, to cancel the Wi-Fi connection between the to-be-switched terminal and the second access device, so as to complete the process of switching from the second access device to the first access device.

It should be noted that, when a connection is successfully established between the to-be-switched terminal and the first access device, and a connection to the second access device is not yet canceled, the to-be-switched terminal are simultaneously accessed two access devices by using a same working channel, that is, the to-be-switched terminal may receive data sent by both the first access device and the second access device, and both the first access device and the second access device may receive data sent by the to-be-switched terminal. To prevent network data from being repeatedly sent to the to-be-switched terminal, or to prevent data sent by the to-be-switched terminal from being repeatedly sent to a network, the first access device and the second access device may transmit an identifier of data to each other by using the NFC connection. When one access device is to forward a particular piece of data, the access device sends an identifier of the data to the other access device, and after receiving the identifier of the data, the other access device may ignore the data, and does not forward the data.

To sum up, according to the terminal switching method provided in this embodiment of the present invention, a first access device establishes a near field communication NFC connection to a second access device, receives an authentication parameter of a to-be-switched terminal that is sent by the second access device by using the NFC connection, performs access authentication on the to-be-switched terminal according to the authentication parameter, and establishes a connection to the to-be-switched terminal after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, in the terminal switching method provided in this embodiment of the present invention, before switching is performed, the second access device has sent the authentication parameter of the to-be-switched terminal to the first access device. Therefore, negotiations between the terminal and the first access device during switching are reduced, and a switching process is smoother.

In addition, according to the terminal switching method provided in this embodiment of the present invention, the first access device receives a channel parameter that is sent by the second access device by using the NFC connection, and establishes a second connection according to the channel parameter, which can simplify a process of interaction with a device when a terminal is switched, and rapidly establish a Wi-Fi connection between the first access device and the to-be-switched terminal, thereby enabling the to-be-switched terminal to be seamlessly switched to the first access device, and improving user experience.

Figure 8:
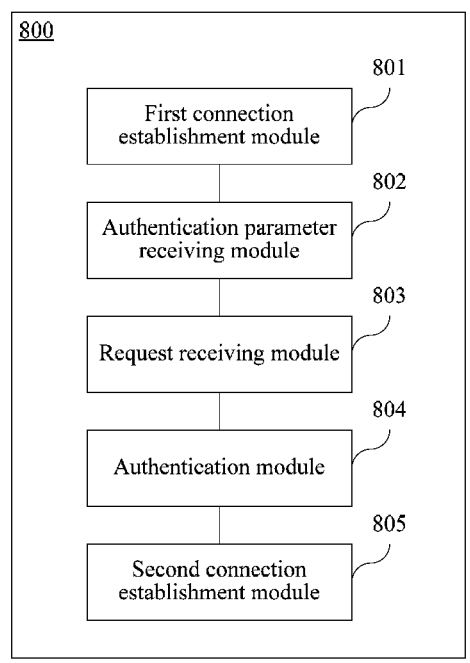
FIG. 8 is a device composition diagram of an access device according to an embodiment of the present invention.

Refer to FIG. 8, which is a device composition diagram of an access device according to an embodiment of the present invention. The access device 800 may be configured to perform the method shown in FIG. 1 or FIG. 2. When a terminal that accesses a second access device needs to be switched from the second access device to another access device, a connection is established to a to-be-switched terminal. The access device 800 may include:

a first connection establishment module 801, configured to: when a distance to a second access device falls within a range of a near field communication NFC connection, establish an NFC connection to the second access device;

an authentication parameter receiving module 802, configured to receive an authentication parameter of a to-be-switched terminal that is sent by the second access device by using the NFC connection, where the to-be-switched terminal is a terminal that has established a first connection to the second access device;

a request receiving module 803, configured to receive an authentication request sent by the to-be-switched terminal;

an authentication module 804, configured to perform access authentication on the to-be-switched terminal according to the authentication parameter; and a second connection establishment module 805, configured to: after the authentication by the authentication module 804 succeeds, establish a second connection to the to-be-switched terminal.

To sum up, according to the access device provided in this embodiment of the present invention, a near field communication NFC connection is established to a second access device, an authentication parameter of a to-be-switched terminal that is sent by the second access device by using the NFC connection is received, access authentication is performed on the to-be-switched terminal according to the authentication parameter, and a connection is established to the to-be-switched terminal after the authentication succeeds. Because a distance of an NFC connection is relatively short, which is generally within one meter, when a distance to the second access device falls within a range of the NFC connection, it indicates that the distance to the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the access device provided in this embodiment of the present invention, the authentication parameter of the to-be-switched terminal that is sent by the second access device is received in advance. Therefore, steps of negotiations when the to-be-switched terminal is switched are reduced, and a switching process is smoother.

Figure 9:
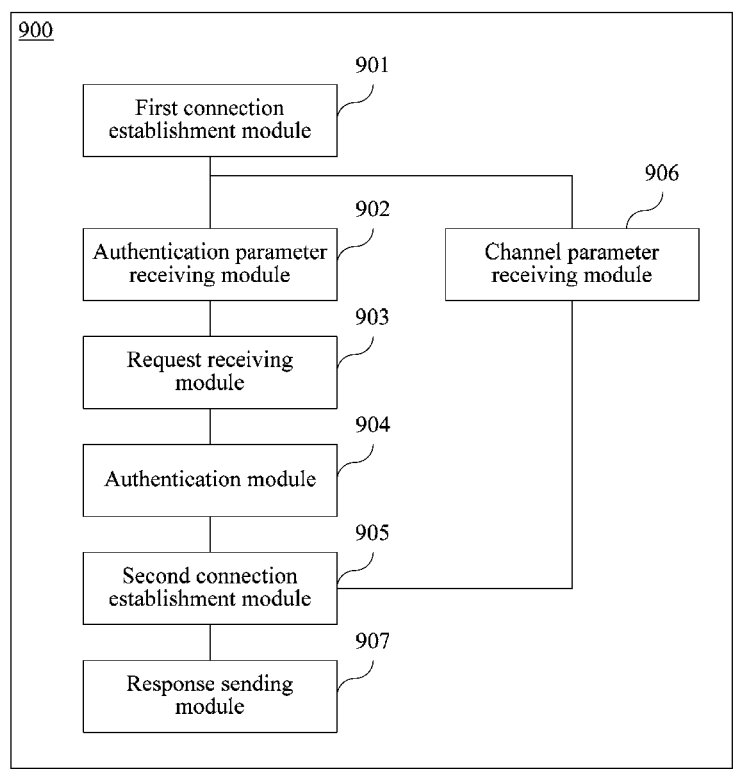
FIG. 9 is a device composition diagram of an access device according to another embodiment of the present invention.

Refer to FIG. 9, which is a device composition diagram of an access device according to an embodiment of the present invention. The access device 900 may be configured to perform the method shown in FIG. 1 or FIG. 2. When a terminal that accesses a second access device needs to be switched from the second access device to another access device, a connection is established to a to-be-switched terminal. The access device 900 is a movable wireless access device such as a Wi-Fi robot. The access device 900 may include:

a first connection establishment module 901, configured to: when a distance to a second access device falls within a range of a near field communication NFC connection, establish an NFC connection to the second access device;

an authentication parameter receiving module 902, configured to receive an authentication parameter of a to-be-switched terminal that is sent by the second access device by using the NFC connection, where the to-be-switched terminal is a terminal that has established a first connection to the second access device;

a request receiving module 903, configured to receive an authentication request sent by the to-be-switched terminal;

an authentication module 904, configured to perform access authentication on the to-be-switched terminal according to the authentication parameter; and a second connection establishment module 905, configured to: after the authentication by the authentication module 904 succeeds, establish a second connection to the to-be-switched terminal.

The access device 900 further includes:

a channel parameter receiving module 906, configured to: before the second connection establishment module 905 establishes the second connection to the to-be-switched terminal, receive a channel parameter that is sent by the second access device by using the NFC connection, where the channel parameter is a channel parameter for the to-be-switched terminal to access the second access device; and the second connection establishment module 905 is configured to establish the second connection to the to-be-switched terminal according to the channel parameter.

The access device 900 further includes:

a response sending module 907, configured to send a connection success response to the to-be-switched terminal, where the connection success response is used to instruct the to-be-switched terminal to cancel the first connection to the second access device.

To sum up, according to the access device provided in this embodiment of the present invention, a near field communication NFC connection is established to a second access device, an authentication parameter of a to-be-switched terminal that is sent by the second access device by using the NFC connection is received, access authentication is performed on the to-be-switched terminal according to the authentication parameter, and a connection is established to the to-be-switched terminal after the authentication succeeds. Because a distance of an NFC connection is relatively short, which is generally within one meter, when a distance to the second access device falls within a range of the NFC connection, it indicates that the distance to the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the access device provided in this embodiment of the present invention, the authentication parameter of the to-be-switched terminal that is sent by the second access device is received in advance. Therefore, steps of negotiations when the to-be-switched terminal is switched are reduced, and a switching process is smoother.

In addition, according to the access device provided in this embodiment of the present invention, a channel parameter that is sent by the second access device by using the NFC connection is received, and a second connection is established according to the channel parameter, which can simplify a process of interaction with a device when a terminal is switched, and rapidly establish a Wi-Fi connection between the first access device and the to-be-switched terminal, thereby enabling the to-be-switched terminal to be seamlessly switched to another access device, and improving user experience.

Figure 10:
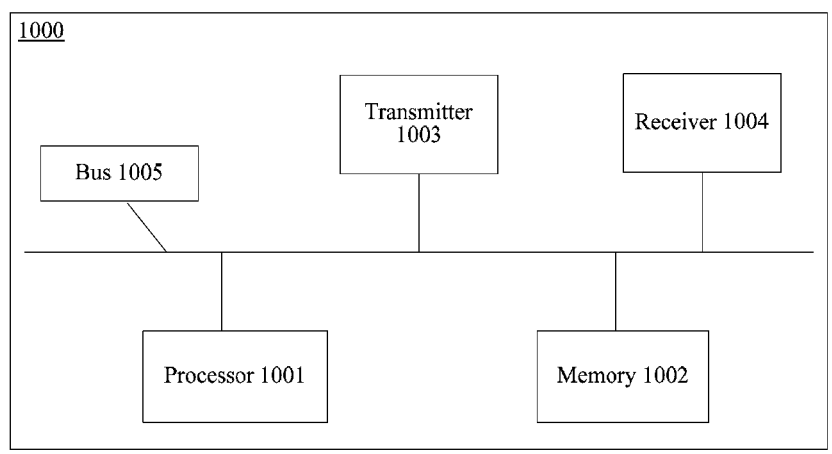
FIG. 10 is a device composition diagram of an access device according to an embodiment of the present invention.

Refer to FIG. 10, which is a device composition diagram of an access device according to an embodiment of the present invention. The access device 1000 may be used to perform the method shown in FIG. 1 or FIG. 2. When a terminal that accesses a second access device needs to be switched from the second access device to another access device, a connection is established to a to-be-switched terminal. The access device 1000 may include: a bus 1005, and a processor 1001, a memory 1002, a transmitter 1003, and a receiver 1004 that are accessed the bus 1005. The memory 1002 is configured to store several instructions, and the several instructions are configured to be executed by the processor 1001.

The processor 1001 is configured to execute the several instructions, and when a distance to the second access device falls within a range of a near field communication NFC connection, control the transmitter 1003 and the receiver 1004 to establish an NFC connection to the second access device.

The receiver 1004 is configured to receive an authentication parameter of a to-be-switched terminal that is sent by the second access device by using the NFC connection, where the to-be-switched terminal is a terminal that has established a first connection to the second access device.

The receiver 1004 is further configured to receive an authentication request sent by the to-be-switched terminal.

The processor 1001 is configured to perform access authentication on the to-be-switched terminal according to the authentication parameter.

The processor 1001 is configured to: after the authentication succeeds, control the transmitter 1003 and the receiver 1004 to establish a second connection to the to-be-switched terminal.

To sum up, according to the access device provided in this embodiment of the present invention, a near field communication NFC connection is established to a second access device, an authentication parameter of a to-be-switched terminal that is sent by the second access device by using the NFC connection is received, access authentication is performed on the to-be-switched terminal according to the authentication parameter, and a connection is established to the to-be-switched terminal after the authentication succeeds. Because a distance of an NFC connection is relatively short, which is generally within one meter, when a distance to the second access device falls within a range of the NFC connection, it indicates that the distance to the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the access device provided in this embodiment of the present invention, the authentication parameter of the to-be-switched terminal that is sent by the second access device is received in advance. Therefore, steps of negotiations when the to-be-switched terminal is switched are reduced, and a switching process is smoother.

Figure 11:
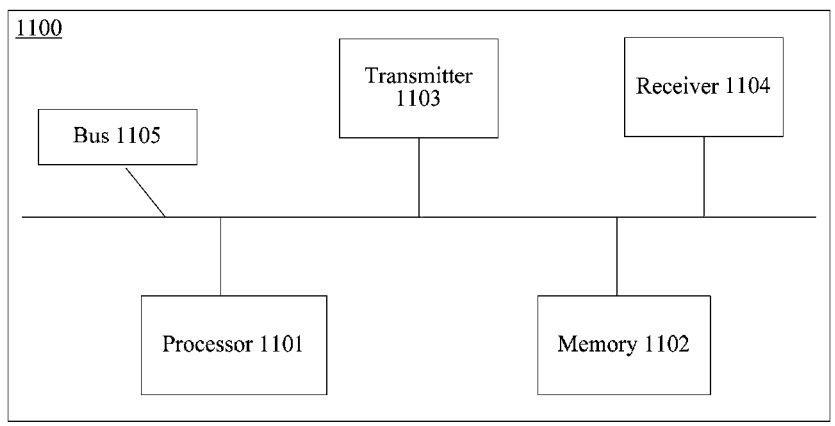
FIG. 11 is a device composition diagram of an access device according to another embodiment of the present invention.

Refer to FIG. 11, which is a device composition diagram of an access device according to an embodiment of the present invention. The access device 1100 may be configured to perform the method shown in FIG. 1 or FIG. 2. When a terminal that accesses a second access device needs to be switched from the second access device to another access device, a connection is established to a to-be-switched terminal. The access device 1100 is a movable wireless access device such as a Wi-Fi robot. The access device 1100 may include: a bus 1105, and a processor 1101, a memory 1102, a transmitter 1103, and a receiver 1104 that are accessed the bus 1105. The memory 1102 is configured to store several instructions, and the several instructions are configured to be executed by the processor 1101.

The processor 1101 is configured to execute the several instructions, and when a distance to the second access device falls within a range of a near field communication NFC connection, control the transmitter 1103 and the receiver 1104 to establish an NFC connection to the second access device.

The receiver 1104 is configured to receive an authentication parameter of a to-be-switched terminal that is sent by the second access device by using the NFC connection, where the to-be-switched terminal is a terminal that has established a first connection to the second access device.

The receiver 1104 is configured to receive an authentication request sent by the to-be-switched terminal.

The processor 1101 is configured to perform access authentication on the to-be-switched terminal according to the authentication parameter.

The processor 1101 is configured to: after the authentication succeeds, control the transmitter 1103 and the receiver 1104 to establish a second connection to the to-be-switched terminal.

Further, the receiver 1104 is further configured to receive a channel parameter that is sent by the second access device by using the NFC connection, where the channel parameter is a channel parameter for the to-be-switched terminal to access the second access device.

The processor 1101 is configured to control the transmitter 1103 and the receiver 1104 to establish the second connection to the to-be-switched terminal according to the channel parameter.

The processor 1101 is configured to control the transmitter 1103 to send a connection success response to the to-be-switched terminal, where the connection success response is used to instruct the to-be-switched terminal to cancel the first connection to the second access device.

To sum up, according to the access device provided in this embodiment of the present invention, a near field communication NFC connection is established to a second access device, an authentication parameter of a to-be-switched terminal that is sent by the second access device by using the NFC connection is received, access authentication is performed on the to-be-switched terminal according to the authentication parameter, and a connection is established to the to-be-switched terminal after the authentication succeeds. Because a distance of an NFC connection is relatively short, which is generally within one meter, when a distance to the second access device falls within a range of the NFC connection, it indicates that the distance to the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the access device provided in this embodiment of the present invention, the authentication parameter of the to-be-switched terminal that is sent by the second access device is received in advance. Therefore, steps of negotiations when the to-be-switched terminal is switched are reduced, and a switching process is smoother.

In addition, according to the access device provided in this embodiment of the present invention, a channel parameter that is sent by the second access device by using the NFC connection is received, and a second connection is established according to the channel parameter, which can simplify a process of interaction with a device when a terminal is switched, and rapidly establish a Wi-Fi connection to the to-be-switched terminal, thereby enabling the to-be-switched terminal to be seamlessly switched to an access device, and improving user experience.

Figure 12:
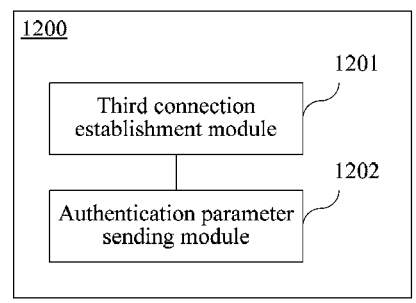
FIG. 12 is a device composition diagram of an access device according to an embodiment of the present invention.

Refer to FIG. 12, which is a device composition diagram of an access device according to an embodiment of the present invention. The access device 1200 may be configured to perform the method shown in FIG. 3 or FIG. 4. A terminal that accesses the access device 1200 is switched to a first access device. The access device 1200 is a movable wireless access device such as a Wi-Fi robot. The access device 1200 may include:

a third connection establishment module 1201, configured to: when a distance to a first access device falls within a range of a near field communication NFC connection, establish an NFC connection to the first access device; and an authentication parameter sending module 1202, configured to send an authentication parameter of a to-be-switched terminal to the first access device by using the NFC connection, where the to-be-switched terminal is a terminal that has established a first connection to the third connection establishment module 1201, and the authentication parameter is used to instruct the first access device to perform access authentication on the to-be-switched terminal according to the authentication parameter and establish a second connection to the to-be-switched terminal after the authentication succeeds.

To sum up, according to the access device provided in this embodiment of the present invention, an NFC connection is established to a first access device, an authentication parameter of a to-be-switched terminal is sent to the first access device by using the NFC connection, and the first access device performs access authentication on the to-be-switched terminal according to the authentication parameter and establishes a second connection to the to-be-switched terminal after the authentication succeeds. Because a distance of an NFC connection is relatively short, which is generally within one meter, when a distance to the first access device falls within a range of the NFC connection, it indicates that the distance to the first access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the access device provided in this embodiment of the present invention, the authentication parameter of the to-be-switched terminal is sent to the first access device in advance. Therefore, steps of negotiations between the to-be-switched terminal and the first access device when the to-be-switched terminal is switched are reduced, and a switching process is smoother.

Figure 13:
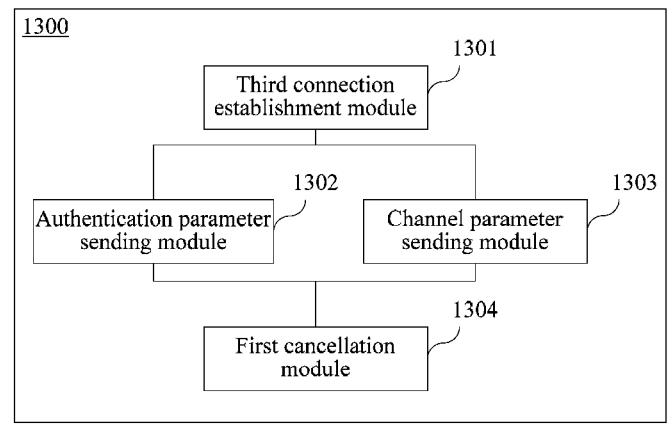
FIG. 13 is a device composition diagram of an access device according to another embodiment of the present invention.

Refer to FIG. 13, which is a device composition diagram of an access device according to another embodiment of the present invention. The access device 1300 may be configured to perform the method shown in FIG. 3 or FIG. 4. A terminal that accesses the access device 1300 is switched to a first access device. The access device 1300 is a movable wireless access device such as a Wi-Fi robot. The access device 1300 may include:

a third connection establishment module 1301, configured to: when a distance to a first access device falls within a range of a near field communication NFC connection, establish an NFC connection to the first access device; and an authentication parameter sending module 1302, configured to send an authentication parameter of a to-be-switched terminal to the first access device by using the NFC connection, where the to-be-switched terminal is a terminal that has established a first connection to the third connection establishment module 1301, and the authentication parameter is used to instruct the first access device to perform access authentication on the to-be-switched terminal according to the authentication parameter and establish a second connection to the to-be-switched terminal after the authentication succeeds.

The access device 1300 further includes:

a channel parameter sending module 1303, configured to send a channel parameter to the first access device by using the NFC connection, where the channel parameter is an access channel parameter of the to-be-switched terminal.

The access device 1300 further includes:

a first cancellation module 1304, configured to: after the first access device has established the second connection to the to-be-switched terminal, cancel the first connection to the to-be-switched terminal.

To sum up, according to the access device provided in this embodiment of the present invention, an NFC connection is established to a first access device, an authentication parameter of a to-be-switched terminal is sent to the first access device by using the NFC connection, and the first access device performs access authentication on the to-be-switched terminal according to the authentication parameter, and establishes a second connection to the to-be-switched terminal after the authentication succeeds. Because a distance of an NFC connection is relatively short, which is generally within one meter, when a distance to the first access device falls within a range of the NFC connection, it indicates that the distance to the first access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the access device provided in this embodiment of the present invention, the authentication parameter of the to-be-switched terminal is sent to the first access device in advance. Therefore, steps of negotiations between the to-be-switched terminal and the first access device when the to-be-switched terminal is switched are reduced, and a switching process is smoother.

In addition, according to the access device provided in this embodiment of the present invention, a channel parameter is sent to the first access device by using the NFC connection, and the first access device establishes a second connection according to the channel parameter, which can simplify a process of interaction with a device when a terminal is switched, and rapidly establish a Wi-Fi connection between the first access device and the to-be-switched terminal, thereby enabling the to-be-switched terminal to be seamlessly switched to the first access device, and improving user experience.

Figure 14:
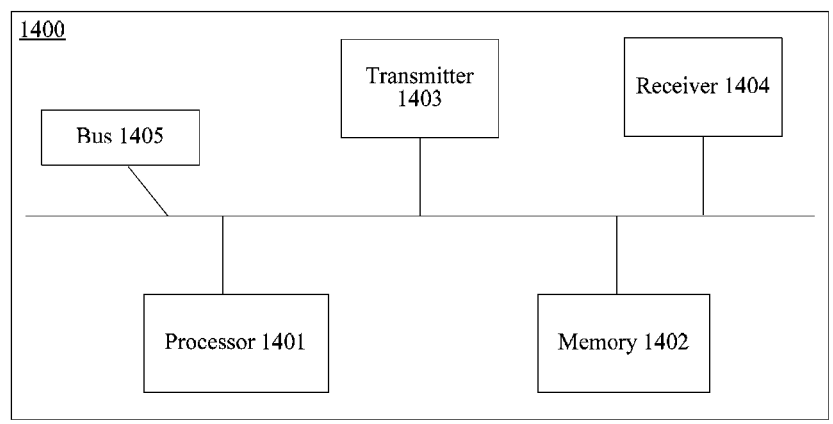
FIG. 14 is a device composition diagram of an access device according to an embodiment of the present invention.

Refer to FIG. 14, which is a device composition diagram of an access device according to an embodiment of the present invention. The access device 1400 may be configured to perform the method shown in FIG. 3 or FIG. 4. A terminal that accesses the access device 1400 is switched to a first access device. The access device 1400 is a movable wireless access device such as a Wi-Fi robot. The access device 1400 may include: a bus 1405, and a processor 1401, a memory 1402, a transmitter 1403, and a receiver 1404 that are accessed the bus 1405. The memory 1402 is configured to store several instructions, and the several instructions are configured to be executed by the processor 1401.

The processor 1401 is configured to execute the instructions, and when a distance to a first access device falls within a range of a near field communication NFC connection, control the transmitter 1403 and the receiver 1404 to establish an NFC connection to the first access device.

The processor 1401 is configured to control the transmitter 1403 to send an authentication parameter of a to-be-switched terminal to the first access device by using the NFC connection, where the to-be-switched terminal is a terminal that has established a first connection to the access device, and the authentication parameter is used to instruct the first access device to perform access authentication on the to-be-switched terminal according to the authentication parameter and establish a second connection to the to-be-switched terminal after the authentication succeeds.

To sum up, according to the access device provided in this embodiment of the present invention, an NFC connection is established to a first access device, an authentication parameter of a to-be-switched terminal is sent to the first access device by using the NFC connection, and the first access device performs access authentication on the to-be-switched terminal according to the authentication parameter, and establishes a second connection to the to-be-switched terminal after the authentication succeeds. Because a distance of an NFC connection is relatively short, which is generally within one meter, when a distance to the first access device falls within a range of the NFC connection, it indicates that the distance to the first access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the access device provided in this embodiment of the present invention, the authentication parameter of the to-be-switched terminal is sent to the first access device in advance. Therefore, steps of negotiations between the to-be-switched terminal and the first access device when the to-be-switched terminal is switched are reduced, and a switching process is smoother.

Figure 15:
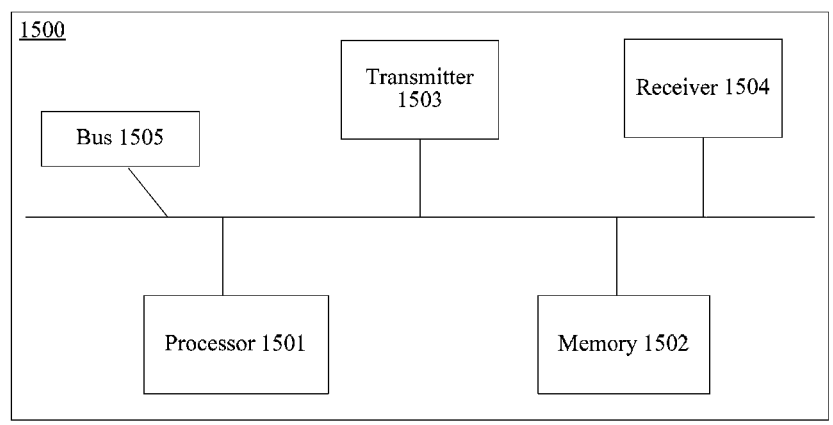
FIG. 15 is a device composition diagram of an access device according to another embodiment of the present invention.

Refer to FIG. 15, which is a device composition diagram of an access device according to another embodiment of the present invention. The access device 1500 may be configured to perform the method shown in FIG. 3 or FIG. 4. A terminal that accesses the access device 1500 is switched to a first access device. The access device 1500 is a movable wireless access device such as a Wi-Fi robot. The access device 1500 may include: a bus 1505, and a processor 1501, a memory 1502, a transmitter 1503, and a receiver 1504 that are accessed the bus 1505. The memory 1502 is configured to store several instructions, and the several instructions are configured to be executed by the processor 1501.

The processor 1501 is configured to: when a distance to a first access device falls within a range of a near field communication NFC connection, control the transmitter 1503 and the receiver 1504 to establish an NFC connection to the first access device.

The processor 1501 is configured to control the transmitter 1503 to send an authentication parameter of a to-be-switched terminal to the first access device by using the NFC connection, where the to-be-switched terminal is a terminal that has established a first connection to the access device, and the authentication parameter is used to instruct the first access device to perform access authentication on the to-be-switched terminal according to the authentication parameter and establish a second connection to the to-be-switched terminal after the authentication succeeds.

The processor 1501 is configured to control the transmitter 1503 to send a channel parameter to the first access device by using the NFC connection, where the channel parameter is an access channel parameter of the to-be-switched terminal.

The processor 1501 is configured to: after the first access device has established the second connection to the to-be-switched terminal, control the transmitter 1503 and the receiver 1504 to cancel the first connection to the to-be-switched terminal.

To sum up, according to the access device provided in this embodiment of the present invention, an NFC connection is established to a first access device, an authentication parameter of a to-be-switched terminal is sent to the first access device by using the NFC connection, and the first access device performs access authentication on the to-be-switched terminal according to the authentication parameter, and establishes a second connection to the to-be-switched terminal after the authentication succeeds. Because a distance of an NFC connection is relatively short, which is generally within one meter, when a distance to the first access device falls within a range of the NFC connection, it indicates that the distance to the first access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Further, according to the access device provided in this embodiment of the present invention, the authentication parameter of the to-be-switched terminal is sent to the first access device in advance. Therefore, steps of negotiations between the to-be-switched terminal and the first access device when the to-be-switched terminal is switched are reduced, and a switching process is smoother.

In addition, according to the access device provided in this embodiment of the present invention, a channel parameter is sent to the first access device by using the NFC connection, and the first access device establishes a second connection according to the channel parameter, which can simplify a process of interaction with a device when a terminal is switched, and rapidly establish a Wi-Fi connection between the first access device and the to-be-switched terminal, thereby enabling the to-be-switched terminal to be seamlessly switched to the first access device, and improving user experience.

Figure 16:
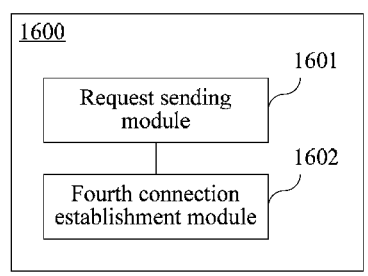
FIG. 16 is a device composition diagram of a terminal according to an embodiment of the present invention.

Refer to FIG. 16, which is a device composition diagram of a terminal according to an embodiment of the present invention. The terminal 1600 may perform the method shown in FIG. 5 or FIG. 6, and is switched from a second access device to a first access device. The first access device and the second access device are movable wireless access devices such as Wi-Fi robots. The terminal 1600 may include:

a request sending module 1601, configured to send an authentication request to a first access device, where the authentication request is used to instruct the first access device to perform access authentication on the to-be-switched terminal according to an authentication parameter, where the authentication parameter is a parameter that is sent to the first access device by the second access device by using a near field communication NFC connection; and a fourth connection establishment module 1602, configured to: after the authentication by the first access device succeeds, establish a second connection to the first access device.

To sum up, according to the terminal provided in this embodiment of the present invention, after a first access device receives an authentication parameter that is sent by a second access device by using an NFC connection, an authentication request is sent to the first access device, the first access device performs access authentication according to the authentication parameter, and a second connection is established to the first access device after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Figure 17:
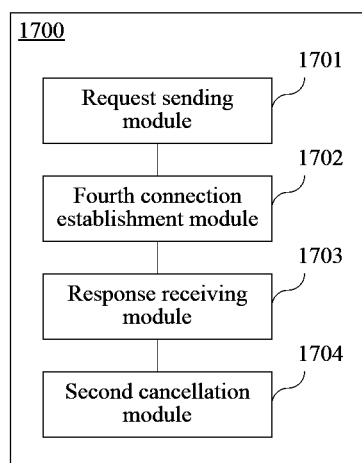
FIG. 17 is a device composition diagram of a terminal according to another embodiment of the present invention.

Refer to FIG. 17, which is a device composition diagram of a terminal according to another embodiment of the present invention. The terminal 1700 may perform the method shown in FIG. 5 or FIG. 6, and is switched from a second access device to a first access device. The first access device and the second access device are movable wireless access devices such as Wi-Fi robots. The terminal may include:

a request sending module 1701, configured to send an authentication request to a first access device, where the authentication request is used to instruct the first access device to perform access authentication on the to-be-switched terminal according to an authentication parameter, where the authentication parameter is a parameter that is sent to the first access device by the second access device by using a near field communication NFC connection; and a fourth connection establishment module 1702, configured to: after the authentication by the first access device succeeds, establish a second connection to the first access device.

The terminal 1700 further includes:

a response receiving module 1703, configured to receive a connection success response sent by the first access device; and a second cancellation module 1704, configured to cancel the first connection to the second access device.

To sum up, according to the terminal provided in this embodiment of the present invention, after a first access device receives an authentication parameter that is sent by a second access device by using an NFC connection, an authentication request is sent to the first access device, the first access device performs access authentication according to the authentication parameter, and a second connection is established to the first access device after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Figure 18:
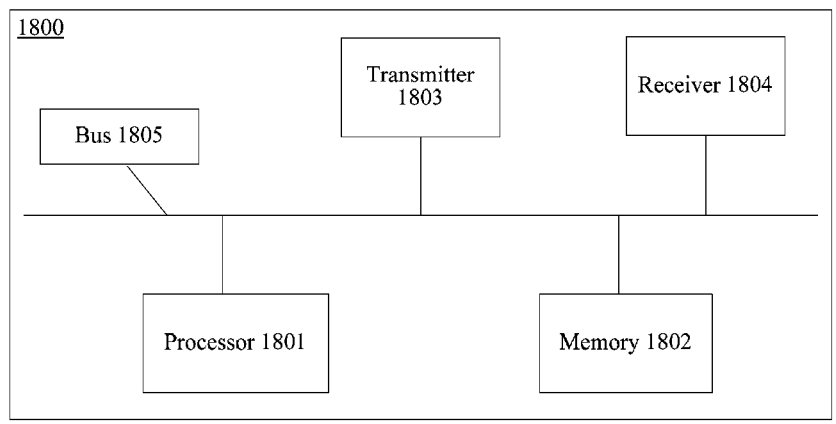
FIG. 18 is a device composition diagram of a terminal according to an embodiment of the present invention.

Refer to FIG. 18, which is a device composition diagram of a terminal according to an embodiment of the present invention. The terminal 1800 may perform the method shown in FIG. 5 or FIG. 6, and is switched from a second access device to a first access device. The first access device and the second access device are movable wireless access devices such as Wi-Fi robots. The terminal 1800 may include: a bus 1805, and a processor 1801, a memory 1802, a transmitter 1803, and a receiver 1804 that are accessed the bus 1805. The memory 1802 is configured to store several instructions, and the several instructions are configured to be executed by the processor 1801.

The processor 1801 is configured to control the transmitter 1803 to send an authentication request to a first access device, where the authentication request is used to instruct the first access device to perform access authentication on the to-be-switched terminal according to an authentication parameter, where the authentication parameter is a parameter that is sent to the first access device by the second access device by using a near field communication NFC connection.

The processor 1801 is configured to: after the authentication by the first access device succeeds, control the transmitter 1803 and the receiver 1804 to establish a second connection to the first access device.

To sum up, according to the terminal provided in this embodiment of the present invention, after a first access device receives an authentication parameter that is sent by a second access device by using an NFC connection, an authentication request is sent to the first access device, the first access device performs access authentication according to the authentication parameter, and a second connection is established to the first access device after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Figure 19:
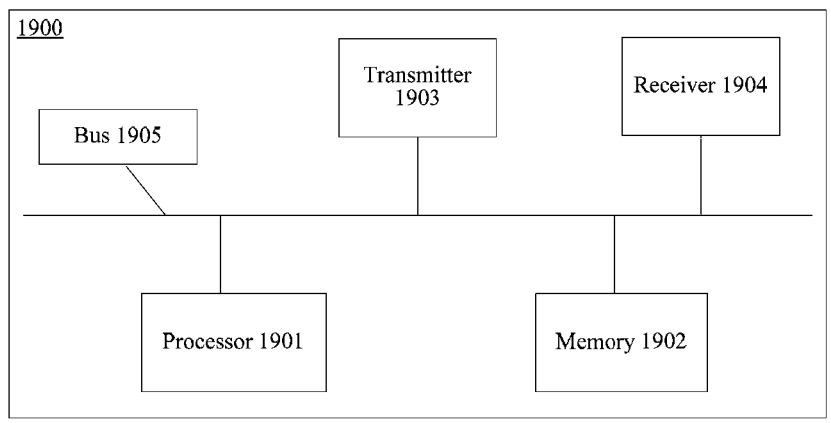
FIG. 19 is a device composition diagram of a terminal according to another embodiment of the present invention.

Refer to FIG. 19, which is a device composition diagram of a terminal according to another embodiment of the present invention. The terminal 1900 may perform the method shown in FIG. 5 or FIG. 6, and is switched from a second access device to a first access device. The first access device and the second access device are movable wireless access devices such as Wi-Fi robots. The terminal 1900 may include: a bus 1905, and a processor 1901, a memory 1902, a transmitter 1903, and a receiver 1904 that are accessed the bus 1905. The memory 1902 is configured to store several instructions, and the several instructions are configured to be executed by the processor 1901.

The processor 1901 is configured to send an authentication request to a first access device, where the authentication request is used to instruct the first access device to perform access authentication on the to-be-switched terminal according to an authentication parameter, where the authentication parameter is a parameter that is sent to the first access device by the second access device by using a near field communication NFC connection.

The processor 1901 is configured to: after the authentication by the first access device succeeds, control the transmitter 1903 and the receiver 1904 to establish a second connection to the first access device.

The receiver 1904 is configured to receive a connection success response sent by the first access device.

The processor 1901 is configured to control the transmitter 1903 and the receiver 1904 to cancel the first connection to the second access device.

To sum up, according to the terminal provided in this embodiment of the present invention, after a first access device receives an authentication parameter that is sent by a second access device by using an NFC connection, an authentication request is sent to the first access device, the first access device performs access authentication according to the authentication parameter, and a second connection is established to the first access device after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Figure 20:
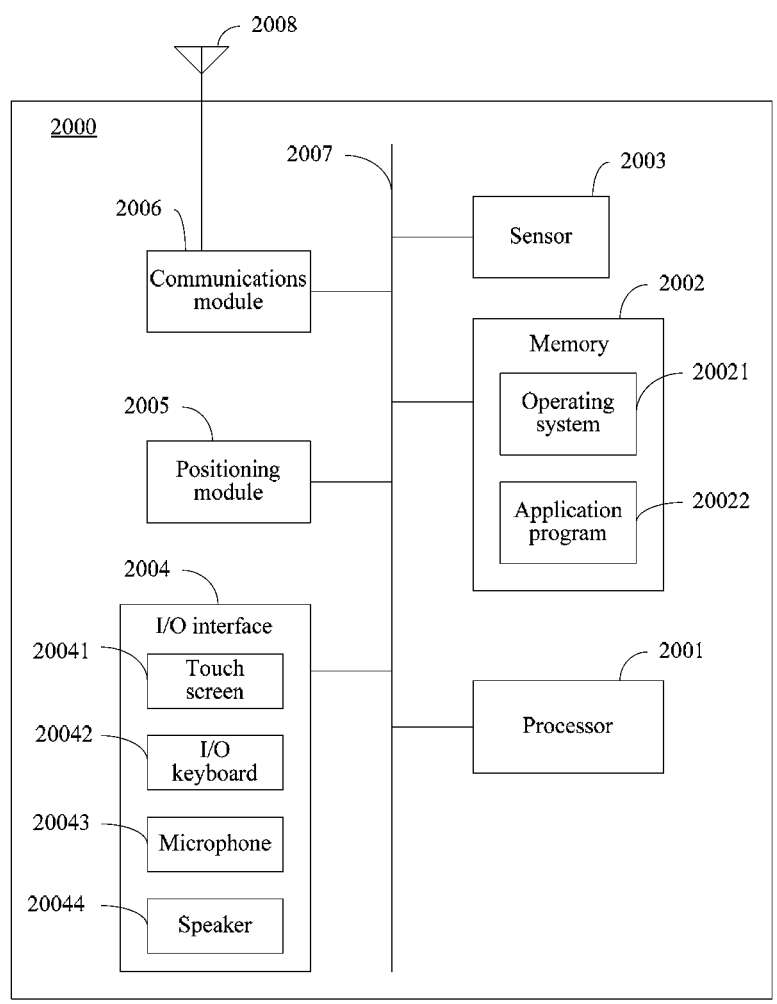
FIG. 20 is a block diagram of a smartphone according to an embodiment of the present invention.

FIG. 20 is a block diagram of a smartphone according to an embodiment of the present invention. It should be noted that, the smartphone 2000 shown in FIG. 20 is only an example of the terminal shown in any one of FIG. 16 to FIG. 19, and the smartphone 2000 may have components more or less than those shown in FIG. 20, may combine two or more components, or may have different component configurations. The components shown in FIG. 20 may be implemented in hardware, software, or a combination of hardware and software that includes one or more signal processors and/or application-specific integrated circuits.

The smartphone 2000 is used as an example for specific descriptions. As shown in FIG. 20, the smartphone 2000 includes at least one processor 2001, a memory 2002, a sensor 2003, an I/O interface 2004, a positioning module 2005, a communications module 2006, at least one communications bus 2007, and a communications antenna 2008. The smartphone 2000 further includes other functional components such as a battery module and a wired/wireless charging interface. The communications bus 2007 is configured to implement connection and communication between these components. The memory 2002 may include a non-volatile solid-state memory and/or a non-volatile dynamic storage device such as a flash memory and a rotatable disk drive. The sensor module 2003 includes multiple types of sensors such as a proximity sensor, an accelerometer sensor, an electronic compass sensor, and a light sensor, and is configured to measure information about an orientation/movement state of the smartphone 2000. The positioning module 2005 may be configured to perform a function such as GPS (Global Positioning System, global positioning system) positioning, WLAN positioning, and base station positioning, to acquire geographical information such as a location or an altitude of the smartphone 2000. The communications module 2006 may be used for long range communication, for example, GSM (Global System for Mobile Communications), CDMA (Code Division Multiple Access), GPRS (General Packet Radio Service), and EDGE (Enhanced Data Rate for GSM Evolution), a 3G technology such as WCDMA (Wideband Code Division Multiple Access) and TD-SCDMA (Time Division-Synchronous Code Division Multiple Access), and a 4G technology such as LTE (Long Term Evolution). The communications module 2006 may be further used for short range communication, and may perform short range wireless communication such as ZigBee, UWB, Wi-Fi, Bluetooth, NFC, and infrared communication with another mobile intelligent terminal or wearable sound collection apparatus. The communications antenna 2008 is configured to receive and send a communications signal.

Specifically, the I/O interface 2004 includes a touch screen 20041 for display and input, an I/O keyboard 20042 (optional) for input, a microphone 20043, that is, the microphone array described above, a speaker 20044, and the like.

Specifically, the memory 2002 includes an operating system 20021 and an application program 20022. The operating system 20021 includes various operating system programs, and is configured to implement hardware-based operations. The application program 20022 includes various application programs, and is configured to implement various application functions. For example, a speech recognition program or a speed assistant program can perform security authentication on a user according to a voiceprint feature of a speech input of the user, or may parse out a semantic meaning from an input speech signal of the user, to perform a corresponding function and operation, for example, taking a photograph, searching contacts according to the semantic meaning for a user and making a phone call or sending a short message service message, or answering an incoming call or replying to a short message service message.

Specifically, the memory 2002 may be configured to store an orientation/movement state, where the orientation/movement state includes at least an approximate distance and an approximate distance change rate, or may include a horizontal tilt, a horizontal tilt change rate, an acceleration change rate, and an azimuth change rate; or may be configured to store a sound collected by the sound collection apparatus and a speech signal acquired from the sound collection apparatus.

Further, the memory 2002 may be further configured to store a first threshold, a second threshold, a third threshold, a fourth threshold, a fifth threshold, and a preset range of the horizontal tilt.

Optionally, the memory 2002 may be further configured to store a mixed speech signal.

The processor 2001 communicates with the modules and components by using the bus 2007. The sensor 2003 detects and acquires the orientation/movement state, and the processor 2001 determines the sound collection apparatus according to the method in the embodiments described above. If it is determined that the sound collection apparatus is a microphone array, a sound is acquired by using the microphone 20043, the sound is converted into a speech signal, and the speech signal is transmitted to the processor 2001. If the sound collection apparatus is a wearable sound collection apparatus, a sound collected by the wearable sound collection apparatus is received by using the antenna 2008, the sound is converted into a speech signal, and the speech signal is transmitted to the processor 2001.

When the smartphone provided in this embodiment of the present invention establishes a first connection to a second access device, after a first access device receives an authentication parameter that is sent by the second access device by using an NFC connection, the smartphone may send an authentication request to the first access device, the first access device performs access authentication according to the authentication parameter, and the smartphone may establish a second connection to the first access device after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

Figure 21:
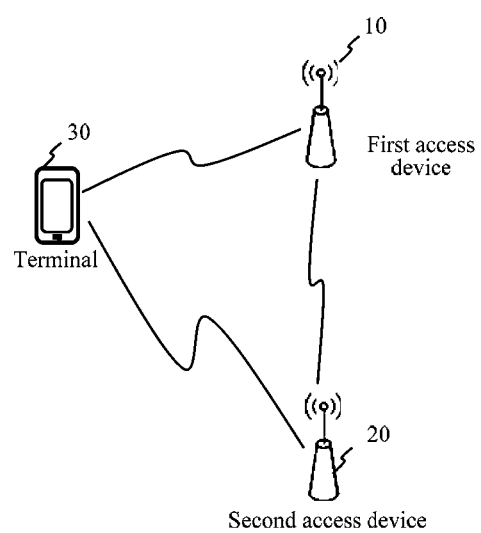
FIG. 21 is a system composition diagram of a terminal switching system according to an embodiment of the present invention.

Refer to FIG. 21, which is a system composition diagram of a terminal switching system according to an embodiment of the present invention. The system may be configured to perform the method shown in FIG. 7, and a to-be-switched device is switched from a second access device to a first access device. The first access device and the second access device are movable wireless access devices such as Wi-Fi robots. The system may include:

the first access device 10 shown in any one of FIG. 8 to FIG. 11, the second access device 20 shown in any one of FIG. 12 to FIG. 15, and at least one terminal 30 shown in any one of FIG. 16 to FIG. 19.

To sum up, according to the terminal switching system provided in this embodiment of the present invention, a first access device establishes a near field communication NFC connection to a second access device, receives an authentication parameter of a to-be-switched terminal that is sent by the second access device by using the NFC connection, performs access authentication on the to-be-switched terminal according to the authentication parameter, and establishes a connection to the to-be-switched terminal after the authentication succeeds. Because a distance of an NFC connection is relatively short, which is generally within one meter, when a distance between the first access device and the second access device falls within a range of the NFC connection, it indicates that the distance between the first access device and the second access device is very short, which resolves a problem in the prior art that when a terminal is switched from a wireless access device to another wireless access device, the terminal may possibly access an access device whose location is relatively remote, and improves communication performance of the terminal and user experience after switching of the terminal to an access device.

In addition, according to the terminal switching system provided in this embodiment of the present invention, the first access device receives a channel parameter that is sent by the second access device by using the NFC connection, and establishes a second connection according to the channel parameter, which can simplify a process of interaction with a device when a terminal is switched, and rapidly establish a Wi-Fi connection between the first access device and the to-be-switched terminal, thereby enabling the to-be-switched terminal to be seamlessly switched to the first access device, and improving user experience.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A terminal switching method, wherein the method comprises:
    when a distance between a first access device and a second access device falls within a range of a near field communication (NFC) connection, establishing, by the first access device, an NFC connection to the second access device;
    receiving, by the first access device, an authentication parameter of a to-be-switched terminal that is sent by the second access device by using the NFC connection, wherein the to-be-switched terminal is a terminal that has established a first connection to the second access device;
    receiving, by the first access device, an authentication request sent by the to-be-switched terminal; and
    performing, by the first access device, access authentication on the to-be-switched terminal according to the authentication parameter, and establishing a second connection to the to-be-switched terminal after the authentication succeeds.

2. The method according to claim 1, wherein the method further comprises:
    receiving a channel parameter that is sent by the second access device by using the NFC connection, wherein the channel parameter is an access channel parameter of the to-be-switched terminal; and
    the establishing a second connection to the to-be-switched terminal after the authentication succeeds comprises:
    establishing the second connection to the to-be-switched terminal according to the channel parameter.

3. The method according to claim 1, wherein the method further comprises:
    sending a connection success response to the to-be-switched terminal, wherein the connection success response is used to instruct the to-be-switched terminal to cancel the first connection to the second access device.

4. A terminal switching method, wherein the method comprises:
    when a distance between a first access device and a second access device falls within a range of a near field communication NFC connection, establishing, by the second access device, an NFC connection to the first access device; and
    sending, by the second access device, an authentication parameter of a to-be-switched terminal to the first access device by using the NFC connection, wherein the to-be-switched terminal is a terminal that has established a first connection to the second access device, and the authentication parameter is used to instruct the first access device to perform access authentication on the to-be-switched terminal according to the authentication parameter and establish a second connection to the to-be-switched terminal after the authentication succeeds.

5. The method according to claim 4, wherein the method further comprises:
    sending a channel parameter to the first access device by using the NFC connection, wherein the channel parameter is an access channel parameter of the to-be-switched terminal.

6. The method according to claim 4, wherein the method further comprises:
    after the first access device has established the second connection to the to-be-switched terminal, canceling the first connection to the to-be-switched terminal.

7. A terminal switching method, wherein the method comprises:
    sending, by a to-be-switched terminal, an authentication request to a first access device, wherein the to-be-switched terminal is a terminal that has established a first connection to a second access device, and the authentication request is used to instruct the first access device to perform access authentication on the to-be-switched terminal according to an authentication parameter, wherein the authentication parameter is a parameter that is sent to the first access device by the second access device by using a near field communication NFC connection; and
    after the authentication by the first access device succeeds, establishing, by the to-be-switched terminal, a second connection to the first access device.

8. The method according to claim 7, wherein the method further comprises:
    receiving a connection success response sent by the first access device.

9. An access device, wherein the access device comprises:
    a first connection establishment module, configured to: when a distance to a second access device falls within a range of a near field communication NFC connection, establish an NFC connection to the second access device;
    an authentication parameter receiving module, configured to receive an authentication parameter of a to-be-switched terminal that is sent by the second access device by using the NFC connection, wherein the to-be-switched terminal is a terminal that has established a first connection to the second access device;
    a request receiving module, configured to receive an authentication request sent by the to-be-switched terminal;

an authentication module, configured to perform access authentication on the to-be-switched terminal according to the authentication parameter; and a second connection establishment module, configured to: after the authentication by the authentication module succeeds, establish a second connection to the to-be-switched terminal.

10. The access device according to claim 9, wherein the access device further comprises:

a channel parameter receiving module, configured to: before the second connection establishment module establishes the second connection to the to-be-switched terminal, receive a channel parameter that is sent by the second access device by using the NFC connection, wherein the channel parameter is an access channel parameter of the to-be-switched terminal; and the second connection establishment module is configured to establish the second connection to the to-be-switched terminal according to the channel parameter.

11. The access device according to claim 9, wherein the first access device further comprises:

a response sending module, configured to send a connection success response to the to-be-switched terminal, wherein the connection success response is used to instruct the to-be-switched terminal to cancel the first connection to the second access device.

12. A terminal, wherein the terminal comprises:

a request sending module, configured to send an authentication request to a first access device, wherein the authentication request is used to instruct the first access device to perform access authentication on the to-be-switched terminal according to an authentication parameter, wherein the authentication parameter is a parameter that is sent to the first access device by the second access device by using a near field communication NFC connection; and a fourth connection establishment module, configured to: after the authentication by the first access device succeeds, establish a second connection to the first access device.

13. The terminal according to claim 12, wherein the terminal further comprises:

a response receiving module, configured to receive a connection success response sent by the first access device.

* * * * *